United States Patent Office
3,278,040
Patented Oct. 11, 1966

3,278,040
ATTAPULGITE CLAY FILTER AID PRODUCT CONTAINING COMBINATION OF FLUXES AND METHOD FOR MAKING SAME
Morris M. Goldberg, Brooklyn, N.Y., and Aldo P. Allegrini, Westfield, and Tom A. Cecil, Highland Park, N.J., assignors to Minerals & Chemicals Philipp Corporation, a corporation of Maryland
No Drawing. Filed Oct. 15, 1963, Ser. No. 316,451
5 Claims. (Cl. 210—500)

This invention relates to filter aid products and is directed especially to improvements in the clay filter aid product of U.S. Patent No. 3,080,214 to James B. Duke and Ernest W. Greene.

Filtration is a widely used operation in the chemical industries and is basically a straining operation designed to remove suspended solids from a liquid. Thus, filtration should be distinguished from decolorization operations in which liquids are treated with solid adsorbents which remove soluble color body impurities by a mechanism involving adsorption. A filter aid, which is a finely divided solid, may be precoated on the filter support and is usually also mixed with the liquid to be filtered. Filtration removes both the filter aid and foreign solids from the liquid, and the filter aid added with the liquid gradually forms a rigid, permeable incompressible cake on the filter cloth or screen. Fine solids originally suspended in the liquid are simultaneously entrained in the cake as it is built up and the porous nature of the cake prevents such solids from agglomerating and forming an impervious layer on the filter cloth or screen. Filtration of liquid through the porous bulky cake is thus more rapid and efficient than it would be in the absence of a filter aid.

One of the most promising new developments in the field of filter aids has been the discovery of a technique for processing a particular type of colloidal clay material, namely colloidal attapulgite clay, to produce a sodium fluxed filter aid powder. The clay treatment, described and claimed in U.S. Patent No. 3,080,214, is generally as follows:

The colloidal form of attapulgite clay (Georgia-Florida fuller's earth) is dispersed in a relatively large amount of a dilute aqueous solution of an alkali metal polyphosphate clay deflocculating agent, the fluid dispersion quiescently dried, ground to a powdery condition and calcined at a temperature sufficient to dehydrate the clay. In accordance with a preferred form of the invention, described and claimed in a copending patent application, Serial No. 38,753, filed June 27, 1960, now abandoned, a small amount of sodium hydroxide is dissolved in the aqueous solution of the alkali metal polyphosphate deflocculating agent to improve the properties of the clay dispersion and to facilitate the use of higher drying temperatures. As a result of the addition of the alkali with the polyphosphate compound in the dispersion step, the combination of alkali-bearing compounds functions as a flux for the clay during calcination.

For certain filtration applications, a filter aid powder of very high filter rate or flow rate index is desirable. For such applications the filter aid powder of the process of U.S. 3,080,214 may leave something to be desired. An increase in flow rate of the clay filter aid product can be effected by increasing the calcination temperature above about 1650° F. However, the increase is moderate only and when calcination temperature exceeds about 1750° F. for an appreciable time, the increase in flow rate is accompanied by undesirable changes in filtration properties of the clay filter aid powder. More specifically, when processed at high calcination temperatures, the filter cake formed by the powder decreases in porosity (increases in bulk density). As a corollary, relatively large quantities of filter aid are required. When the filter cake density is extremely high, clarification may be impaired.

Efforts have been made to increase the filter rate of the aforementioned clay filter aid powder by increasing the quantity of alkali flux, either by incorporating larger quantities of sodium compounds in the aqueous clay dispersion or by adding a sodium flux to the dry ground dispersion before it is calcined. These attempts have had limited success at most. Any appreciable increase in flow rate that is effected by additional quantity of sodium-bearing flux is invariably accompanied by an undesirable increase in filter cake density when the sodium flux material is added at either point in the process.

Accordingly, an object of this invention is the provision of an attapulgite clay filter air product of increased flow rate at a desirably low filter cake density.

Another object is the provision of a method for increasing the flow rate of an attapulgite clay filter aid without adversely affecting filter cake density.

A specific object is to achieve the foregoing by means of a combination of fluxes.

Further objects and features will be apparent.

Stated briefly, in accordance with the present invention, an improved attapulgite clay filter aid product is obtained by flux calcining attapulgite clay with a mixture of (1) alkali metal polyphosphate, especially sodium polyphosphate, (2) sodium hydroxide and (3) lime, the alkali metal polyphosphate and sodium hydroxide (1) and (2) having been incorporated with the clay when the clay is in the form of a dilute aqueous colloidal clay dispersion and the lime (3) having been incorporated with the clay after the aqueous clay dispersion containing (1) and (2) has been dried quiescently to a solid condition but before the dried dispersion is calcined.

From this brief description of the invention it can be seen that an essential feature of the invention entails the incorporation of alkali metal flux materials in the wet stage of the clay processing and the incorporation of the calcium flux material in the dry stage of clay processing which follows wet processing but precedes calcination. It has been found that when the calcium flux material is added in the wet stage, flow rate is undesirably decreased, not increased as desired. Moreover, it appears to be essential to employ the calcium flux material as the free base since neutralized calcium flux (e.g., calcium carbonate) does not produce the desired results. Substitution of common flux agents for the lime will not suffice. Generally speaking, these other fluxes do not increase flow rate and when they do they impair cake porosity.

The lime material employed in carrying out this invention can be a material composed principally of CaO or $Ca(OH)_2$. In other words, the term "lime" as used herein embraces hydrated lime as well as the material variously referred to as "quicklime," "burnt lime," "caustic lime" or "live lime." A high calcium lime ("fat lime") or a "lean lime" can be used, preferably the former, since magnesia is not an effective flux agent for our clay. Normally limes are associated with minor amounts of at least one of the following impurities: magnesia, alumina, iron oxide and silica.

The quantity of lime employed will depend upon the flow rate desired in the filter aid powder. To obtain a given increase in flow rate for a filter aid powder, the quantity of lime additive will vary with the quantity of alkali flux material used and with the fluxing (calcination) temperature that is employed. To illustrate, in the accompanying example the flow rate index of an alkali fluxed attapulgite clay filter aid material was increased by about 40 percent without impairing cake porosity by using 2½ percent hydrated lime, based on the moisture free clay weight, and a fluxing temperature of 1700° F. Substantially the same result was realized by employing 5 percent hydrated lime and fluxing at 1680° F. By using 7½ percent hydrated lime, the 40 percent increase was effected at 1680° F. while actually reducing the filter cake density. With this same filter aid preparation, an 80 percent increase in flow rate index was achieved with 5 percent hydrated lime addition and a fluxing temperature of 1700° F.

The quantity of fluxing agents employed in carrying out the invention are summarized as follows:

| | Quantity, Wt. Percent based on Volatile Free Wt.[1] of Clay | |
|---|---|---|
| | Range | Preferred Amount |
| Wet stage flux: | | |
| (1) alkali metal polyphosphate clay deflocculating agent, e.g., tetrasodium pyrophosphate, sodium tetraphosphate, sodium hexametaphosphate and analogous potassium polyphosphates | ½–3 | ¾–2½ |
| (2) NaOH | ¼–1½ | ½–1 |
| Dry stage flux: | | |
| (3) Lime (as Ca(OH)$_2$) | ½–12 | 2–10 |

[1] Determined by heating clay to essentially constant weight at 1800° F.

Reference is made to U.S. Patent No. 3,080,214 as to a description of the chemical and physical nature of attapulgite clay suitable as a starting material in our process, and as to descriptions of the preparation of deflocculated clay dispersions, quiescent drying, grinding and calcination to make a clay filter aid. Reference is also made to the following: U.S. Patent 3,050,863 to Aldo P. Allegrini and Tom A. Cecil as to the preferred method of drying said dispersions using a drum drier which is heated internally with steam simultaneously while being heated externally with hot air; a copending application of Aldo P. Allegrini and Tom A. Cecil, Serial No. 38,753, filed June 27, 1960, now abandoned, as to the incorporation of sodium hydroxide into the aqueous clay dispersion of U.S. 3,080,214; and a copending application of Aldo P. Allegrini and Tom A. Cecil, Serial No. 228,266, filed October 4, 1962, now U.S. Patent No. 3,174,826, as to the step of aging of the clay dispersion of U.S. 3,080,214 before quiescent drying.

Before mixing the lime flux with dried deflocculated clay slip containing sodium hydroxide and polyphosphate clay dispersing agent, the clay slurry must be dried to a solid consistency, e.g., to a volatile matter content below about 35 percent, since the presence of the lime material in the wet slip is highly detrimental to filter cake density. The dried slip and lime should be intimately dry mixed before the flux calcination step. When carrying out the preferred form of the invention in which the clay slip is dried quiescently on a rotary drum drier and the dried slip is scraped from the drier as ribbons or flakes, the desired dry mixing can be accomplished by crushing the scraped slip to form macro flakes, typically having a length and width with the range of about ¼" to ¾", adding lime to the flakes and then milling the mixture in fine grinding equipment capable of grinding the mixture to minus 200 mesh (Tyler). Alternatively, minus 200 mesh lime can be mixed with minus 200 mesh dried slip and the mixture calcined.

Calcination temperatures used in forming the flux calcined products of the present invention are typically within the range of 1600° F. to 1800° F., especially 1650° F. to 1700° F. Calcination time will vary considerably with calcination equipment used and should be sufficient to reduce the volatile matter content of the clay to a value below 1 percent by weight without increasing the filter cake density to a value exceeding about 22.5 lbs./ft.$^3$, preferably without increasing the filter cake density to a value in excess of 22.0 lbs. per cubic foot. All other significant variables in the process being constant, flow rate will increase with increase in calcination temperature above 1600° F. However, at temperatures appreciably above 1700° F. cake density may increase undesirably.

After calcination, the clay material should be screened to remove undesirable coarse particles.

When viewed with an optical microscope, the product of this invention appears generally similar to the attapulgite aid product described in U.S. 3,080,214 in that it is composed predominantly of elongated particles having microscopic dimensions. With most preparations, aggregates of such particles will predominate. The product has a dry tamped bulk density, described hereinafter, within the range of about 13 to 20 lbs./ft.$^3$, which is appreciably less than the 26–30 lbs./ft.$^3$ bulk density values of minus 325 mesh grades of low volatile matter attapulgite clay. With attapulgite clay filter aid products obtained by calcination of quiescently dried deflocculated aqueous dispersions, tamped bulk density can usually be correlated directly with filter cake density and a product of low tamped bulk density will invariably have a desirably low filter cake density or high porosity. The flow rate index (defined hereinafter) of products of this invention containing a combination of fluxes may be from 10 percent to about 100 percent greater than the flow rate index would be in the absence of lime cooperative flux agent. The increase in flow rate index varies directly with quantity of lime addition up to about 7 percent lime addition and with calcination temperature up to about 1700° F.

The following example illustrates the benefits of using a combination of alkali metal and lime fluxes in the production of an attapulgite clay filter aid product.

A sample of raw attapulgite clay from a mine near Attapulgus, Georgia, was slipped at 160° F. in an aqueous solution containing tetrasodium pyrophosphate and sodium hydroxide in amounts of 2.5 percent and 0.75 percent, respectively, based on the weight of the clay, on a volatile free clay basis. The slipping step was carried out in a Denver conditioner (a paddle-agitated vessel used in the conditioning of ores for flotation). The clay solids in the slip was 20 percent by weight, expressed on a volatile free clay weight basis. The slip was passed through a 100 mesh (Tyler) screen and the minus 100 mesh slip aged in an open container for about three days without agitation. At the end of the aging period the slip temperature was about 100° F. The aged slip had a lightly gelled consistency but was readily fluidized by mild agitation. The aged slip was drum dried with internal steam at a pressure of about 4 p.s.i.g. simultaneously while external blasts of air at about 250° F. were directed against the outer drying surface. The dried slip was scraped from the drum drier by doctor blades, forming small flake-like ribbons having a free moisture content of about 20 percent. The flakes were dried overnight in an oven at about 250° F. to a free moisture content of about 3 percent (volatile matter content of about 14.5 percent) for the purpose of assuring that the flakes would be sufficiently dry to facilitate fine grinding.

The fluxing additives listed in the accompanying table were added to portions of the dried flakes and thoroughly agitated to mix the ingredients. The mixture was ground in a high speed hammer mill (Mikro-Pulverizer) to about 200 mesh (Tyler) and the minus 200 mesh material placed in a refractory tray and calcined in a muffle furnace for 40 minutes at the temperature indicated in the table. The calcined material was screened through a 200 mesh (Tyler) screen with a light rotary movement to pulverize loosely consolidated matter.

To evaluate the usefulness of the products as filter aid material, the filtration rate (flow rate) value of each sample was evaluated and compared to the flow rate of a commercial calcined diatomaceous earth filter aid material (HyFlo Super-Cel). Also compared were the wet bulk densities of the products, as indicated by properties of the filter cake, especially the thickness.

The flow rate testing was performed in a bomb filter test unit. The unit consisted of a vertical metal tube flanged at the bottom so that it could be bolted to a horizontal circular filter plate which supported a filter cloth and had a vertical opening through the center to permit fluid flow. A discharge valve with a threaded end was screwed to the underside of the filter plate. The filter area was 1.0 square inch. The tube assembly was enclosed in a circulating heated oil bath for temperature control.

A mixture containing 10 percent raw sugar and 90 percent refined sugar was dissolved in sufficient water to produce a 46–47° Brix solution. The filter aid was then added at a 1.33 percent weight dosage to the solution and the contents heated to 100° F. This slurry was then poured into the bomb filter. The bomb was capped and immediately pressurized with nitrogen to 50 p.s.i.g. before opening the flow discharge valve. The discharge valve was opened one minute after charging the solution. The filtrate volumes and corresponding time intervals were measured and recorded. The flow rate was calculated from the time required for 500 cc. of solution to flow through the filter aid.

The absolute flow rate values were converted to index values compared with the corresponding values determined by tests made on the standard diatomaceous earth filter aid product and were determined by assigning the absolute flow rate of the standard diatomaceous earth filter aid product the index value of 100.

To evaluate filter cake or wet bulk density, filter cake thickness was determined by measuring the height of the air-dried filter cakes after use in filtering the sugar solution. Inasmuch as the diameter of the filter cakes obtained in the filtration test bomb were constant and equal weights of filter aid samples were used in the tests, cake thickness varied inversely with filter cake density.

Since there is generally a direct correlation between tamped dry bulk density and filter cake density, tamped dry bulk density of samples were also measured. The procedure employed in measuring tamped dry bulk density is the settling method described in U.S. 2,480,753 to William S. W. McCarter and modified by omitting the "make-up" step.

The results are summarized in the following table.

to lime additive used, demonstrating the fluxing action of the lime.

Data in the table for fluxes other than lime show that, with the exception of sodium carbonate and calcium carbonate at a 1680° F. calcination temperature, these other fluxes impaired flow rate index, the antithesis of an equivalent amount of lime flux. In the case of sodium carbonate flux at 1680° F., cake density was undesirably increased with increase of flow rate index. The moderate increase of flow rate with calcium carbonate was considered to be within experimental error; however, the flux, like the soda ash flux, increased cake density and was, therefore, unsuitable.

The term "volatile matter" (V.M.) refers to the weight percent of a material eliminated when the material is heated substantially to constant weight at about 1800° F. In the case of raw clay, volatile matter is essentially water. The term "free moisture" (F.M.), as used herein, refers to the weight percent of a material eliminated when the material is heated substantially to constant weight at 225° F.

We claim:

1. A high flow rate attapulgite clay filter aid product powder obtained by flux calcining attapulgite clay with a mixture of sodium polyphosphate, sodium hydroxide and lime, said sodium polyphosphate and said sodium hydroxide having been incorporated with a colloidal form of attapulgite clay while said clay is in the form of a dilute aqueous dispersion and said lime having been incorporated with said clay after said aqueous clay dispersion has been quiescently dried and before the dried dispersion is calcined at a temperature within the range of 1600° F. to 1800° F. for a time sufficient to reduce the volatile matter of the clay to a value below 1 percent by weight, the quantity of lime being small in comparison with the quantity of clay and being sufficient to increase substantially the flow rate index of said powder without increasing filter cake density, as compared with flow rate index and filter cake density of the filter aid powder made without any lime addition.

2. In a method for making a filter aid powder from

EFFECT OF SUPPLEMENTARY FLUX ADDITIVES ON THE FILTER AID PROPERTIES OF ALKALI-FLUXED ATTAPULGITE CLAY [1]

| Flux Additive | Percent Additive [2] | Calcination Temp., °F. | Dry Bulk Density, Lbs./ft.³ | Flow Rate Index | Filter Cake Density Lbs./ft.³ |
|---|---|---|---|---|---|
| None | 0.0 | 1,710 | 16.3 | 100 | 21.9 |
|  |  | 1,739 | 18.1 | 143 | 21.9 |
| Hydrated Lime (high calcium). | 2.5 | 1,650 | 15.7 | 79 | 21.9 |
|  |  | 1,680 | 16.4 | 111 | 21.9 |
|  |  | 1,700 | 17.8 | 143 | 21.9 |
|  | 5.0 | 1,630 | 17.7 | 92 | 21.9 |
|  |  | 1,650 | 16.9 | 123 | 21.9 |
|  |  | 1,680 | 18.8 | 145 | 21.9 |
|  |  | 1,700 | 19.4 | 181 | 21.9 |
|  | 7.5 | 1,650 | 17.5 | 125 | 21.9 |
|  |  | 1,680 | 17.7 | 140 | 21.0 |
|  |  | 1,700 | 20.5 | 187 | 22.8 |
| Potash Feldspar | 5.0 | 1,680 | 15.6 | 59 | 22.8 |
| Boric Acid | 5.0 | 1,640 | 28.7 |  |  |
|  |  | 1,680 | 38.9 |  |  |
| Sodium Carbonate | 5.0 | 1,630 | 16.8 | 72 | 21.9 |
|  |  | 1,680 | 22.1 | 223 | 22.8 |
| Calcium Carbonate | 5.0 | 1,680 | 16.8 | 108 | 22.8 |
| Sodium Feldspar | 5.0 | 1,680 | 18.3 | 61 | 23.7 |

[1] Containing 2.5 percent tetrasodium pyrophosphate and 0.75 percent sodium hydroxide.
[2] Based on moisture free clay weight.

Data in the table show that by incorporating 5 percent to 7½ percent hydrated lime with the clay already containing tetrasodium pyrophosphate and sodium hydroxide fluxes and employing a calcination temperature of 1700° F., flow rate index could be increased by 81 percent to 87 percent over the product obtained at a 1710° F. calcination temperature without adversely affecting filter cake porosity (cake density). The data in the table for 2½ percent to 7½ percent lime addition show that to obtain a flow rate index in the neighborhood of about 140, calcination temperature could be decreased in proportion attapulgite clay wherein a colloidal attapulgite clay is agitated in a dilute aqueous solution containing sodium polyphosphate as a clay dispersing agent and sodium hydroxide, thereby to form a flowable deflocculated clay slurry, and said slurry is dried quiescently and then ground and calcined at a temperature within the range of 1600° F. to 1800° F. for a time sufficient to reduce the volatile matter of the clay to a value below 1 percent by weight,
  the improvement which comprises incorporating a small amount of finely divided hydrated lime with said dried slurry before it is calcined.

3. The method of claim 2 wherein said hydrated lime is used in amount within the range of from about 2 percent to 10 percent, based on the volatile free weight of said clay, and calcination is carried out at a temperature within the range of about 1650° F. to 1700° F.

4. The method of claim 2 wherein said slurry is pulverized after drying and the pulverized slurry is mixed dry with said hydrated lime and the mixture ground into a powder before being calcined.

5. In a method for treating attapulgite clay to render it useful as a filter aid which comprises dispersing a small amount of colloidal attapulgite clay in water having dissolved therein tetrasodium pyrophosphate in amount from about ½ percent to about 3 percent, based on the volatile free weight of said clay and sodium hydroxide in amount from about ¼ percent to about 1½ percent, based on the volatile free weight of said clay, aging said dispersion without agitation, quiescently drying a thin layer of said dispersion, pulverizing the dried dispersion so as to obtain flakes, grinding said flakes and calcining the ground flakes at a temperature within the range of from about 1600° F. to about 1800° F. for a time sufficient to reduce the volatile matter of the clay to a value below 1 percent by weight, the improvement which comprises mixing said flakes with hydrated lime in amount within the range of from about 2 percent to about 10 percent of the volatile free weight of the clay in said flakes, and grinding said flakes and said hydrated lime to minus 200 mesh (Tyler) before said flakes are calcined.

References Cited by the Examiner
UNITED STATES PATENTS

| | | |
|---|---|---|
| 2,665,259 | 1/1954 | Buffett. |
| 3,080,214 | 3/1963 | Duke et al. _____ 210—502 XR |
| 3,174,826 | 3/1965 | Allegrini et al. ___ 210—502 XR |

LEON D. ROSDOL, *Primary Examiner.*

JULIUS GREENWALD, *Examiner.*

M. WEINBLATT, *Assistant Examiner.*